United States Patent
Moon

(10) Patent No.: US 10,168,741 B2
(45) Date of Patent: Jan. 1, 2019

(54) APPARATUS AND METHOD FOR DISPLAYING SCREEN

(71) Applicant: Samsung Electronics Co., Ltd., Suwon-si, Gyeonggi-do (KR)

(72) Inventor: Jong-Chae Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 14/989,404

(22) Filed: Jan. 6, 2016

(65) Prior Publication Data

US 2016/0209880 A1    Jul. 21, 2016

(30) Foreign Application Priority Data

Jan. 20, 2015  (KR) .................. 10-2015-0009297

(51) Int. Cl.
| | |
|---|---|
| *G06F 1/16* | (2006.01) |
| *G06F 3/14* | (2006.01) |
| *G06F 3/01* | (2006.01) |
| *G06F 3/0485* | (2013.01) |

(52) U.S. Cl.
CPC .......... *G06F 1/1652* (2013.01); *G06F 1/1626* (2013.01); *G06F 1/1656* (2013.01); *G06F 3/016* (2013.01); *G06F 3/0485* (2013.01); *G06F 3/14* (2013.01); *G06F 2203/04102* (2013.01)

(58) Field of Classification Search
CPC ................ G06F 1/1652; G06F 2203/04102
See application file for complete search history.

(56) References Cited

U.S. PATENT DOCUMENTS

| | | | |
|---|---|---|---|
| 5,636,072 A | 6/1997 | Shibata et al. | |
| 6,967,643 B2* | 11/2005 | Tichy | G06F 1/1616 |
| | | | 345/156 |
| 7,469,381 B2 | 12/2008 | Ording | |
| 2005/0232573 A1 | 10/2005 | Iwauchi et al. | |
| 2008/0303782 A1* | 12/2008 | Grant | G06F 1/1615 |
| | | | 345/156 |
| 2009/0250267 A1 | 10/2009 | Heubel et al. | |
| 2012/0242592 A1 | 9/2012 | Rothkopf et al. | |
| 2013/0117698 A1* | 5/2013 | Park | G06F 3/04817 |
| | | | 715/765 |
| 2013/0335454 A1* | 12/2013 | Birnbaum | G06F 3/016 |
| | | | 345/684 |

(Continued)

FOREIGN PATENT DOCUMENTS

| | | |
|---|---|---|
| EP | 2244169 A2 | 10/2010 |
| EP | 2796964 A1 | 10/2014 |

(Continued)

OTHER PUBLICATIONS

European Office Action dated Oct. 31, 2018, issued in European Patent Application No. 16152086.1.

*Primary Examiner* — Jeffrey A Gaffin
*Assistant Examiner* — Bille M Dahir
(74) *Attorney, Agent, or Firm* — Jefferson IP Law, LLP

(57) ABSTRACT

A screen display apparatus and a method are provided. The method includes displaying a display screen on a flexible display unit, and bending the flexible display unit by activating a driving unit coupled to the flexible display unit when an edge of the display screen is displayed. According to the present disclosure, an electronic device can provide various interactions through the flexible display unit.

20 Claims, 10 Drawing Sheets

(56) References Cited

U.S. PATENT DOCUMENTS

2014/0004906 A1  1/2014  Chi et al.
2014/0104244 A1  4/2014  Baldwin
2014/0350941 A1* 11/2014 Zeigler ................ G10L 21/10
                                                704/275

FOREIGN PATENT DOCUMENTS

| JP | 2014-002378 A | 1/2014 |
| KR | 10-0733891 B1 | 7/2007 |
| KR | 10-2010-0041733 A | 4/2010 |
| KR | 10-2010-0136983 A | 12/2010 |
| KR | 10-2011-0093553 A | 8/2011 |
| WO | 2008150600 A1 | 12/2008 |
| WO | 2010129892 A2 | 11/2010 |
| WO | 2013004919 A1 | 1/2013 |
| WO | 2015002349 A1 | 1/2015 |

* cited by examiner

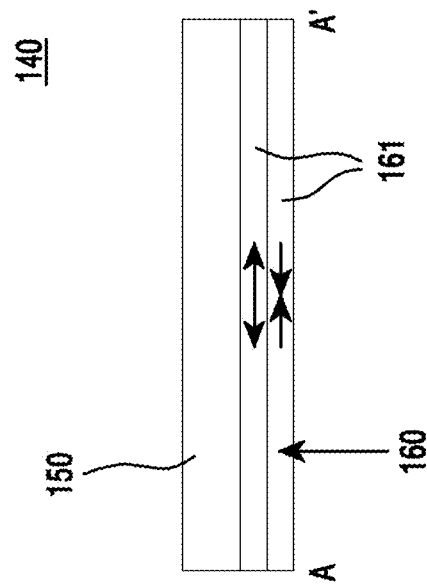
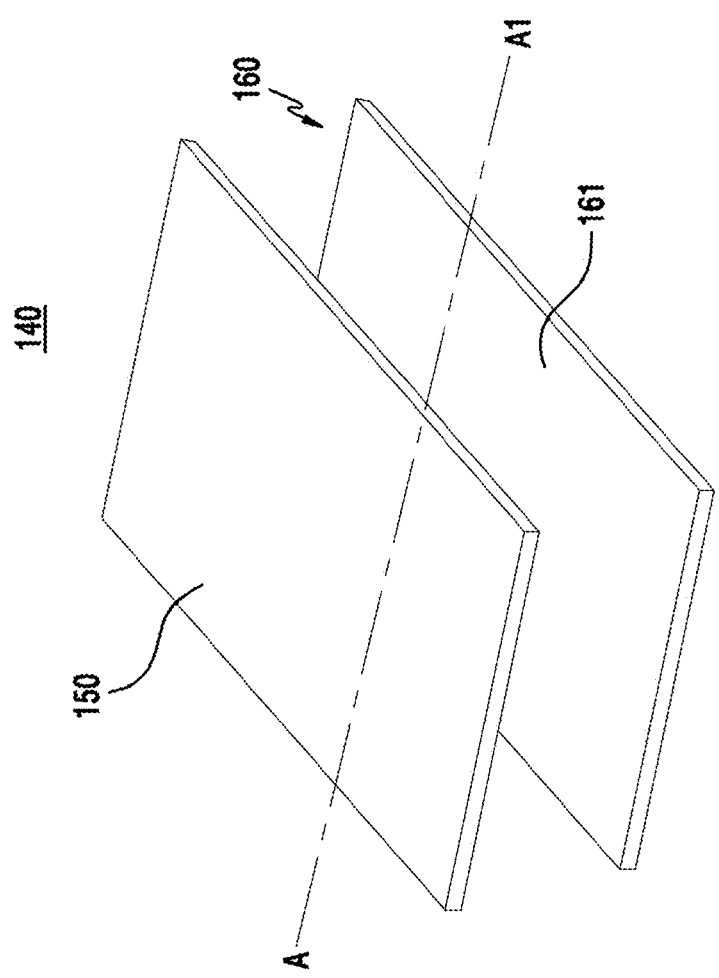
FIG.2B
FIG.2A

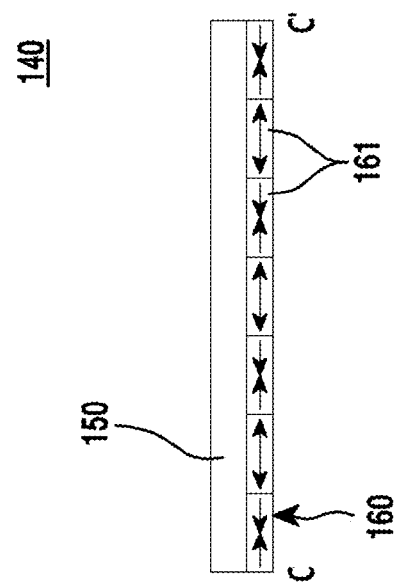
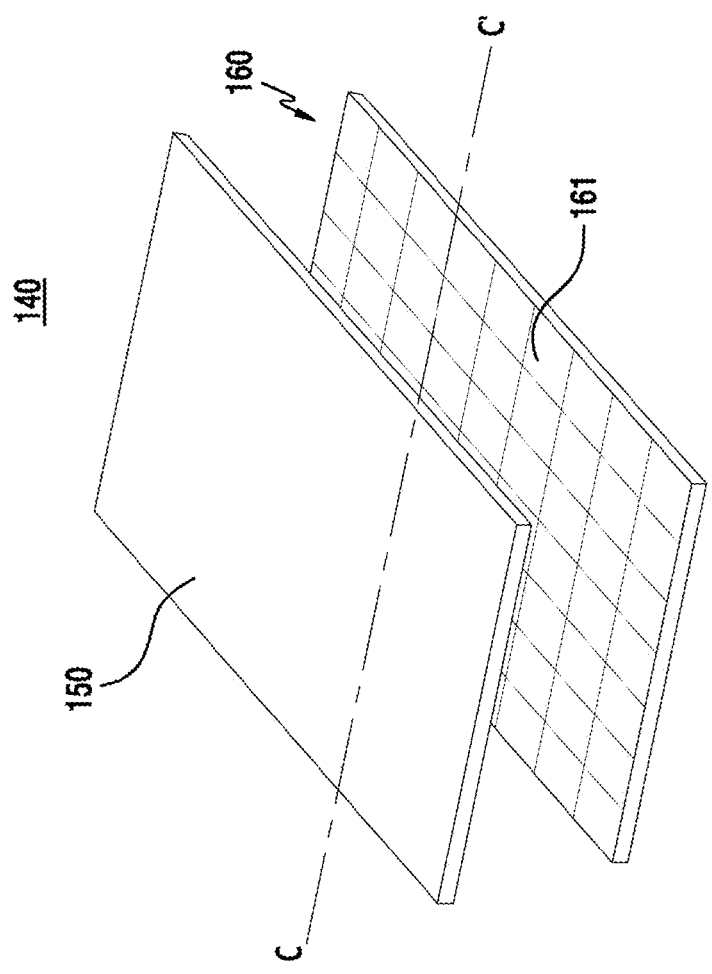
FIG.4B
FIG.4A

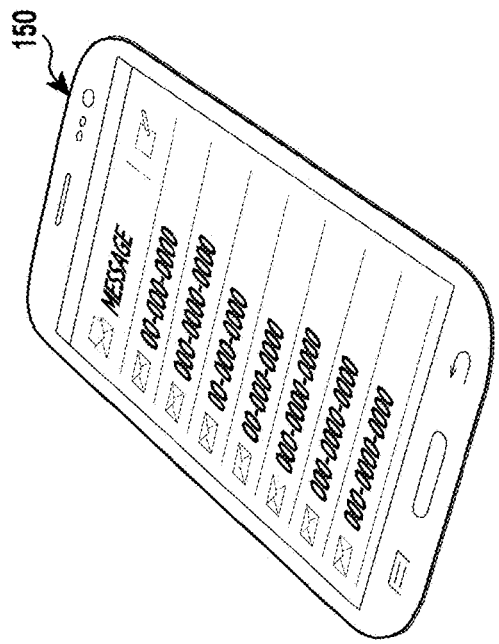
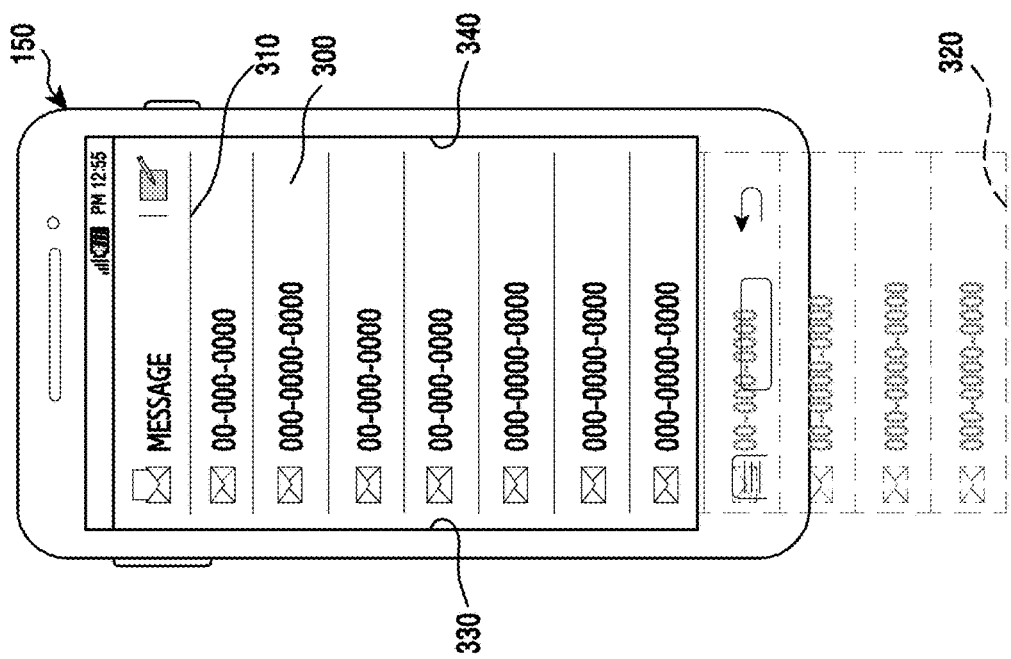
FIG.7B
FIG.7A

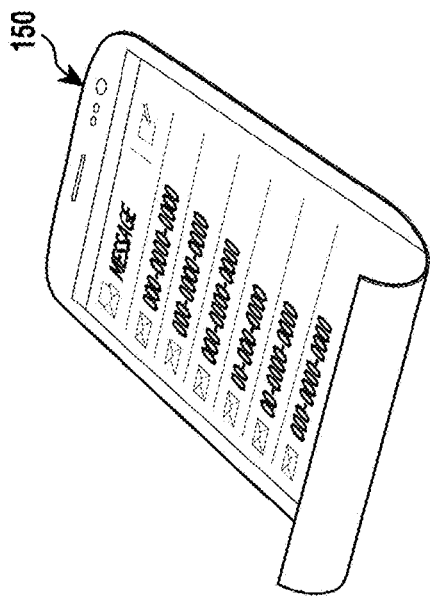
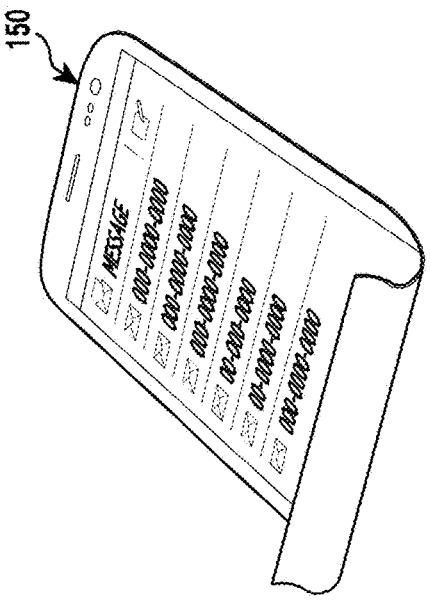
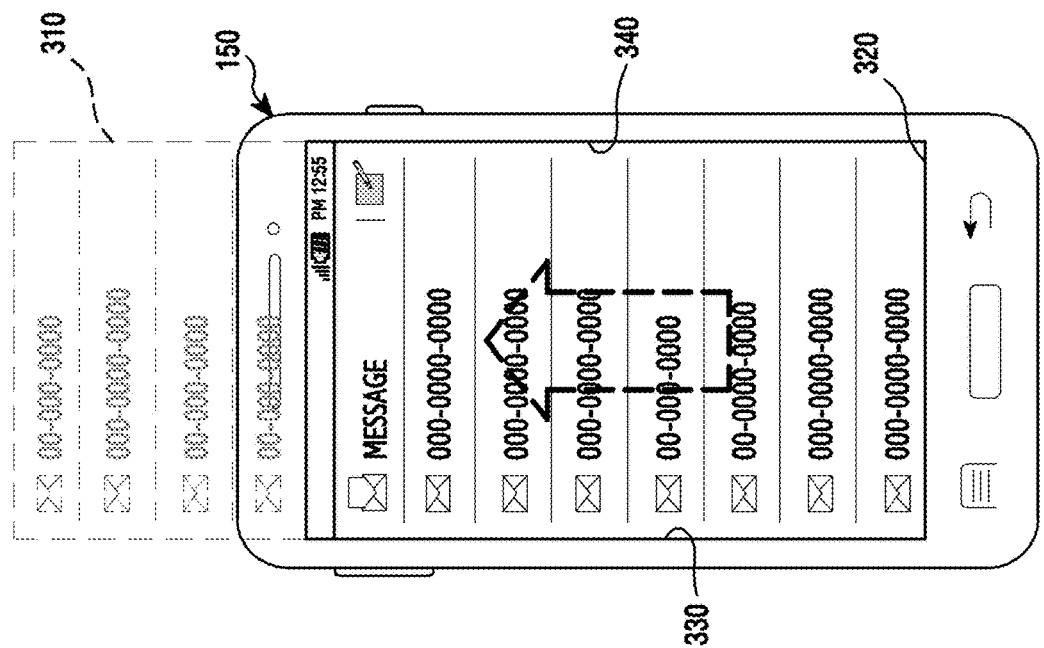

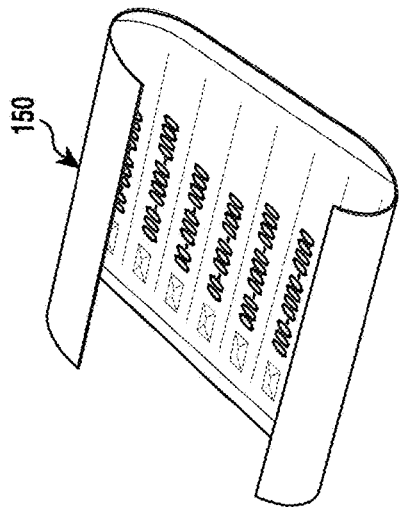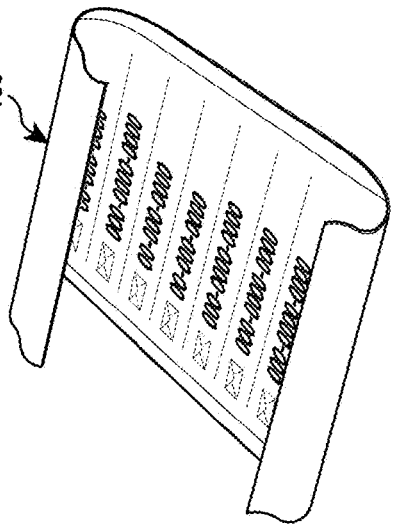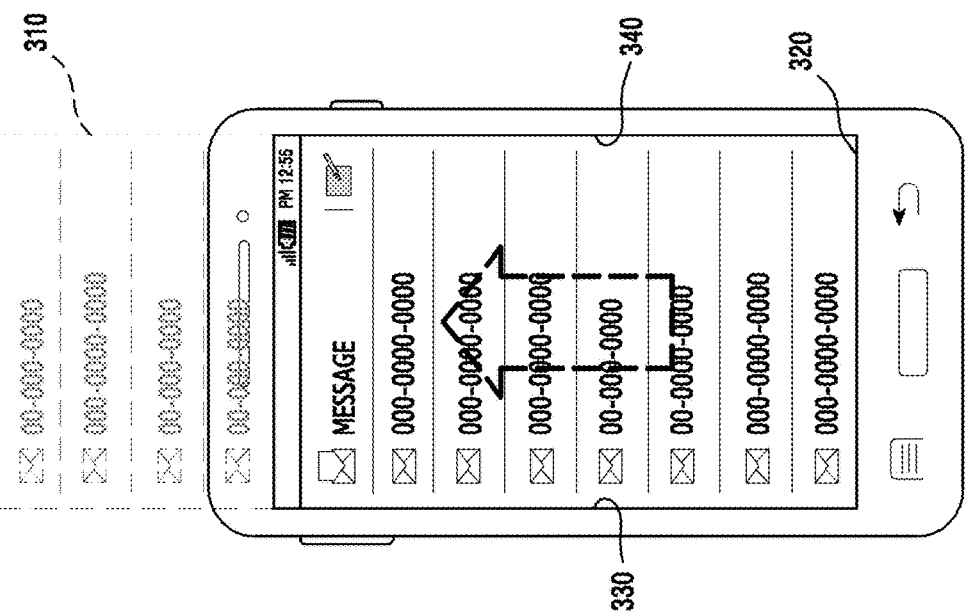

APPARATUS AND METHOD FOR DISPLAYING SCREEN

CROSS-REFERENCE TO RELATED APPLICATION(S)

This application claims the benefit under 35 U.S.C. § 119(a) of a Korean patent application filed on Jan. 20, 2015 in the Korean Intellectual Property Office and assigned Serial No. 10-2015-0009297, the entire disclosure of which is hereby incorporated by reference.

TECHNICAL FIELD

The present disclosure relates to a method and apparatus for displaying a screen. More particularly, the present disclosure relates to a method and apparatus for displaying a screen on a flexible display unit.

BACKGROUND

With advances in technology, various functions have been added to an electronic device in order to perform increasingly complex functions. For example, the electronic device may perform a mobile communication function, a data communication function, a data output function, a data storing function, an image capturing function, a voice recording function, or the like. Such an electronic device has a display unit, and displays data through the display unit. In this case, the display unit may have flexibility. Accordingly, the display unit may be bent without a loss. Further, image quality of the display unit can be maintained even if the display unit is bent.

However, the aforementioned electronic device does not provide various interactions through the display unit. That is, the electronic device does not provide the interface by using the flexibility of the display unit. For this reason, the electronic device has a low efficiency of using the display unit.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for displaying a screen.

In accordance with an aspect of the present disclosure, a screen display method is provided. The screen display method includes displaying a display screen on a flexible display unit, and bending the flexible display unit by activating a driving unit coupled to the flexible display unit when an edge of the display screen is displayed.

In accordance with another aspect of the present disclosure, a screen display apparatus is provided. The screen display apparatus includes a flexible display unit, a driving unit coupled to the flexible display unit and configured to control a display the flexible display unit, and a controller configured to bend the flexible display unit by activating the driving unit when an edge of the flexible display screen is displayed on the flexible display unit.

The screen display apparatus and method according to the present disclosure can control the driving unit to bend the display unit. As a result, an electronic device can provide an interaction for a user input by using the flexibility of the display unit. Therefore, the electronic device can provide various interactions through the display unit. Accordingly, a usage efficiency of the display can be improved in the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A to 5 illustrate examples of implementing a display module of FIG. 1 according to various embodiments of the present disclosure;

FIGS. 7A to 10C illustrate examples of explaining a screen display method according to various embodiments of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
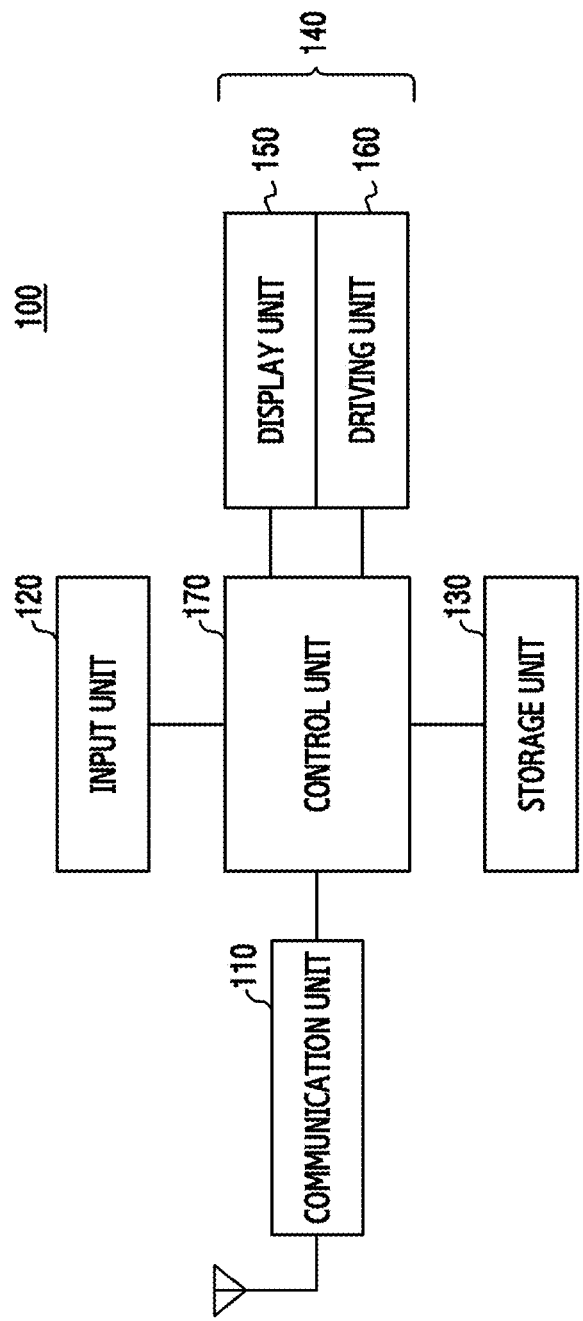
FIG. 1 is a block diagram illustrating an electronic device according to an embodiment of the present disclosure.

FIG. 1 is a block diagram illustrating an electronic device according to an embodiment of the present disclosure.

FIGS. 2A to 5 illustrate examples of implementing a display module of FIG. 1 according to various embodiments of the present disclosure. In this case, FIGS. 2A, 3A, 4A, and 5 are exploded perspective views illustrating the display module, and FIGS. 2B, 3B, and 4B are cross-sectional views illustrating one cross-section of the display module.

Referring to FIG. 1, an electronic device 100 includes a communication unit 110, an input unit 120, a storage unit 130, a display module 140, and a control unit 170.

The communication unit 110 performs communication in the electronic device 100. In this case, the communication unit 110 may communicate with an external device (not shown) by using any of various communication schemes. Herein, the communication unit 110 may perform at least any one of wireless communication and wired communication. For this, the communication unit 110 may access at least any one of a mobile communication network and a data communication network. Alternatively, the communication unit 110 may perform near distance communication. For example, the external electronic device may include an electronic device, a base station, a server, and a satellite. In addition, the communication scheme may include long term evolution (LTE), wideband code division multiple access (WDCMA), global system for mobile communications (GSM), Wi-Fi, Bluetooth, and near field communications (NFC).

The input unit 120 generates input data in the electronic device 100. In this case, the input unit 120 may generate the input data in association with a user input of the electronic device 100. In addition, the input unit 120 may include at least one input means. The input unit 120 may include a key pad, a dome switch, a physical button, a touch panel, a jog & shuttle, and a sensor.

The storage unit 130 stores operational programs of the electronic device 100. In this case, the storage unit 130 may store a program for providing various interactions through the display panel 140. Further, the storage unit 130 may store data generated during execution of the programs.

The display panel 140 provides various interactions in the electronic device 100. The display panel 140 includes a display unit 150 and a driving unit 160.

The display unit 150 outputs display data. In this case, the display unit 150 displays various display screens. Herein, the display screen may include at least any one of an image or a text. In addition, the display unit 150 has a flexibility. Accordingly, the display unit 150 may be bent by an external force. Herein, the display unit 150 may be bent without a loss. Further, even if the display unit 150 is bent, image quality of the display unit 150 may be maintained. The display unit 150 may include a liquid crystal display (LCD), a light emitting diode (LED) display, an organic LED (OLED) display, a micro electro mechanical system (MEMS) display, and an electronic paper display. Herein, the display unit 150 may be coupled to the input unit 120, and may be implemented with a touch screen.

The driving unit 160 changes a shape of the display unit 150. In this case, the driving unit 160 is coupled to the display unit 150. In addition, when the driving unit 160 is activated, the driving unit 160 may change in shape. Herein, the driving unit 160 may be activated in association with an electrical signal. Accordingly, the driving unit 160 may provide an external force to the display unit 150. That is, when the driving unit 160 changes in shape, the driving unit 160 may bend the display unit 150. Herein, the driving unit 160 may allow the display unit 150 to be bent or curved at least one time. Further, when the driving unit 160 is deactivated, the shape of the driving unit 160 may be restored. Herein, the driving unit 160 may be deactivated in association with the electrical signal. Alternatively, the driving unit 160 may be deactivated when a pre-set time elapses from an activated time. Accordingly, the driving unit 160 may restore the shape of the display unit 150. That is, when the shape of the driving unit 160 is restored, the driving unit 160 may restore the shape of the display unit 150.

The driving unit 160 may include at least one piezoelectric element. The piezoelectric element may be contracted or extended in association with an electrical signal. In other words, the piezoelectric element may change in size or volume in association with the electrical signal.

For example, the display panel 140 may be implemented as illustrated in FIGS. 2A and 2B. That is, the display unit 150 may be laminated on the driving unit 160. In addition, the driving unit 160 may include a plurality of piezoelectric elements 161. Further, the piezoelectric elements 161 may be laminated on each other. Herein, the driving unit 160 may include a first piezoelectric element and a second piezoelectric element. Moreover, the first piezoelectric element may be laminated on the second piezoelectric element. In other words, the display unit 150 may be laminated on the first piezoelectric element.

In this case, when the driving unit 160 is activated, the piezoelectric elements 161 may change in shape. That is, the piezoelectric elements 161 may change in shape in a state of being coupled to the display unit 150. Herein, the first piezoelectric element may be extended, and the second piezoelectric element may be contracted. Alternatively, the first piezoelectric element may be contracted, and the second piezoelectric element may be extended. Accordingly, the driving unit 160 may bend the display unit 150. That is, the display unit 150 may be bent when the piezoelectric elements 161 change in shape. Herein, an angle by which the driving unit 160 is capable of bending the display unit 150 may be increased in proportion to the number of laminations of the piezoelectric elements 161. In addition, a range of the angle by which the driving unit 160 is capable of bending the display unit 150 may be increased in proportion to the number of laminations of the piezoelectric elements 161.

Figure 3B:
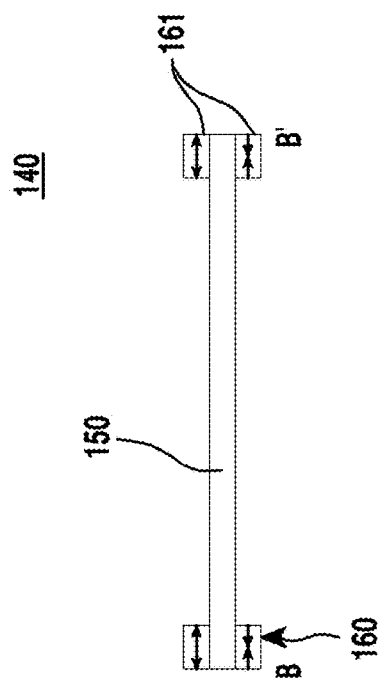
Figure 3A:
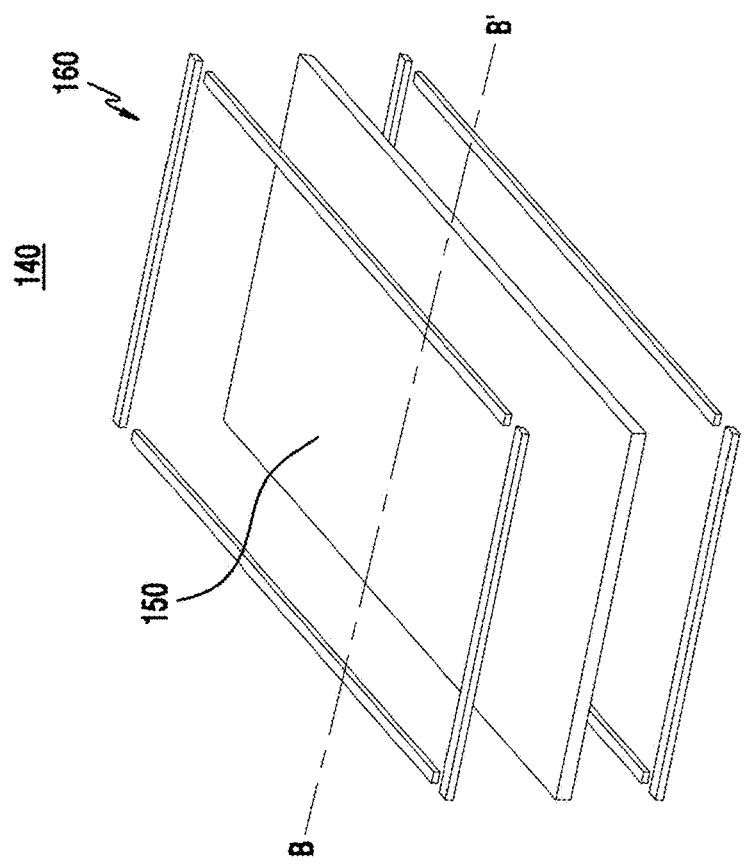

Meanwhile, the display panel 140 may be implemented as illustrated in FIGS. 3A and 3B. That is, the display unit 150 and the driving unit 160 may be laminated on each other. In addition, the driving unit 160 may be disposed on or at edges of the display unit 150. In addition, the driving unit 160 may include the plurality of piezoelectric elements 161. Herein, the driving unit 160 may include the first piezoelectric elements and the second piezoelectric elements. Moreover, the first piezoelectric elements and the second piezoelectric elements may face each other about the display unit 150. In other words, the first piezoelectric elements may be laminated on the display unit 150, and the display unit 150 may be laminated on the second piezoelectric elements. In addition, the first piezoelectric elements and the second piezoelectric elements may be separated from each other. That is, the first piezoelectric elements and the second piezoelectric elements may be disposed at different edges in the display unit 150.

In this case, when the driving unit 160 is activated, the piezoelectric elements 161 may change in shape. That is, the piezoelectric elements 161 may change in shape in a state of being coupled to the display unit 150. Herein, at least any one of the first piezoelectric elements may be extended, and at least any one of the second piezoelectric elements may be contracted. Alternatively, at least any one of the first piezoelectric elements may be contracted, and at least any one of the second piezoelectric elements may be extended. Accordingly, the driving unit 160 may bend the display unit 150. That is, when the piezoelectric elements 161 change in shape, the display unit 150 may be bent. Herein, the driving unit 160 may bend at least any one of the edges of the display unit 150. Alternatively, the driving unit 160 may bend the edges of the display unit 150 in different shapes.

The display panel may be implemented as illustrated in FIGS. 4A and 4B. That is, the display unit 150 may be laminated on the driving unit 160. In addition, the driving unit 160 may include the plurality of piezoelectric elements 161. Further, the piezoelectric elements 161 may be disposed in a checkerboard shape on the same plane. Herein, the driving unit 160 may include the first piezoelectric elements and the second piezoelectric elements. Moreover, any one of the first piezoelectric elements may be disposed between any two of the second piezoelectric elements. Likewise, any one of the second piezoelectric elements may be disposed between any two of the first piezoelectric elements.

In this case, when the driving unit 160 is activated, the piezoelectric elements 161 may change in shape. That is, the piezoelectric elements 161 may change in shape in a state of being coupled to the display unit 150. Herein, at least any one of the first piezoelectric elements may be extended, and at least any one of the second piezoelectric elements may be contracted. Alternatively, at least any one of the first piezoelectric elements may be contracted, and at least any one of the second piezoelectric elements may be extended. Accordingly, the driving unit 160 may bend the display unit 150. That is, when the piezoelectric elements 161 change in shape, the display unit 150 may be bent. Herein, the driving unit 160 may divide the display unit 150 into a plurality of areas and bend at least one of the areas. Alternatively, the driving unit 160 may divide the display unit 150 into the plurality of areas and bend the areas in different shapes.

Figure 5:
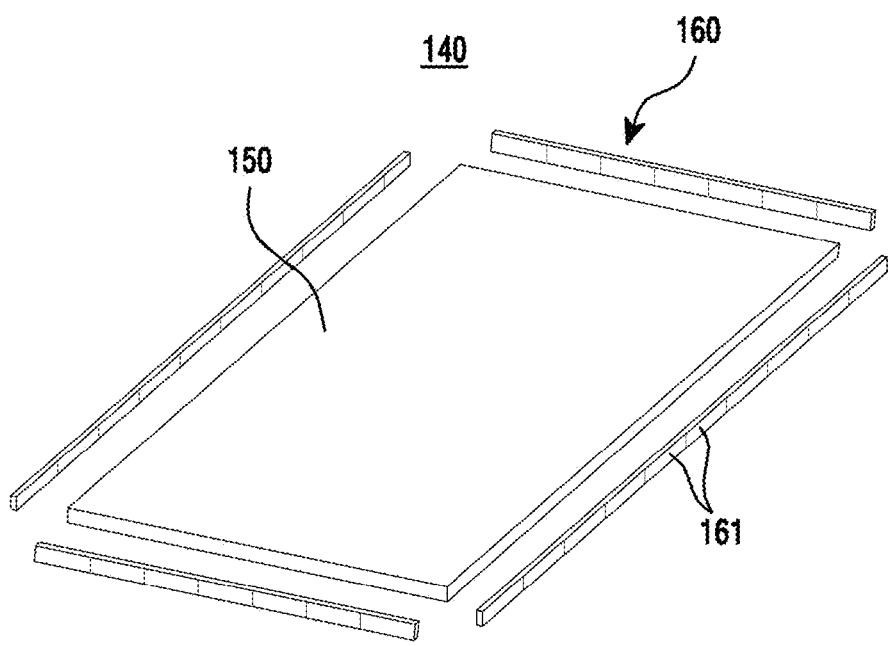

Meanwhile, the display panel may be implemented as illustrated in FIG. 5. That is, the driving unit 160 may be disposed at an edge of the display unit 150. Herein, the display unit 150 and the driving unit 160 may be laminated on each other. In addition, the driving unit 160 may include the plurality of piezoelectric elements 161. Further, the piezoelectric elements 161 may face with each other. Herein, the piezoelectric elements 161 may be disposed by facing at least any one of an upper portion, lower portion, and lateral portion of the display unit 150. Moreover, the driving unit 160 may include the first piezoelectric elements and the second piezoelectric elements. In addition, any one of the first piezoelectric elements may be disposed between any two of the second piezoelectric elements. Likewise, any one of the second piezoelectric elements may be disposed between any two of the first piezoelectric elements.

In this case, when the driving unit 160 is activated, the piezoelectric elements 161 may change in shape. That is, the piezoelectric elements 161 may change in shape in a state of being coupled to the display unit 150. Herein, at least any one of the first piezoelectric elements may be extended, and at least any one of the second piezoelectric elements may be contracted. Alternatively, at least any one of the first piezoelectric elements may be contracted, and at least any one of the second piezoelectric elements may be extended. Accordingly, the driving unit 160 may bend the display unit 150. That is, when the piezoelectric elements 161 change in shape, the display unit 150 may be bent. Herein, the driving unit 160 may bend at least any one of the edges of the display unit 150. Alternatively, the driving unit 160 may bend the edges of the display unit 150 in different shapes.

Meanwhile, although not shown, the driving unit 160 may include a bending portion, a wire, and a motor. The bending portion may be disposed to the lower portion of the display unit 150, and may have a flexibility. The bending portion may have a cylindrical tubular shape, and may have a tubular shape having a thin plate wound in a spiral form. The wire may be disposed inside the bending portion. The motor is connected to the wire, and may provide an attractive force or a repulsive force through rotation.

In this case, when the driving unit 160 is activated, the motor may rotate in one direction to provide the attractive force to the wire. In addition, the wire may use the attractive force to bend or curve the bending portion. Accordingly, the driving unit 160 may bend the display unit 150. That is, when the bending portion changes in shape, the display unit 150 may be bent. Meanwhile, when the driving unit 160 is deactivated, the motor may rotate in a reverse direction to provide the repulsive force to the wire. In addition, the wire may use the repulsive force to restore the bending portion. Accordingly, the driving unit 160 may restore the display unit 150.

Although not shown, the driving unit 160 may include a pneumatic element. The pneumatic element may include a plurality of coupling bars and at least one joint. In this case, the pneumatic element may have a mechanical structure in which the coupling bars are coupled through the joint. In addition, the joint may rotate in association with the electrical signal. Herein, the pneumatic element may use compressed air to rotate the joint.

In this case, when the driving unit 160 is activated, the joint may rotate in one direction to allow the coupling bars to be inclined from each other. That is, any one of the coupling bars may be inclined with respect to one of the remaining coupling bars. Accordingly, the driving unit 160 may bend the display unit 150. That is, when any one of the coupling bars is inclined, the display unit 150 may be bent. Meanwhile, when the driving unit 160 is deactivated, the joint may rotate in the reverse direction to allow the coupling bars to be positioned in parallel. Accordingly, the driving unit 160 may restore the display unit 150.

The controller 170 provides overall control to the electronic device 100. In this case, the controller 170 may provide various interactions through the display panel 140. In addition, the controller 170 may provide the various interactions in association with a user input.

More specifically, the controller 170 may display a display screen through the display unit 150, and may move the display screen. In addition, when an edge of the display screen is displayed through the display unit 150, the controller 170 may activate the driving unit 160 to bend the display unit 150. Herein, when a user input is generated to move the edge of the display screen through the input unit 120, the controller 170 may activate the driving unit 160. That is, the controller 170 may supply the electrical signal to the driving unit 160 to activate the driving unit 160. For example, the controller 170 may bend the display unit 150 differently according to a feature of the user input. In other words, the controller 170 may adjust a bending angle of the display unit 150 according to the feature of the user input. Moreover, the controller 170 may bend the display unit 150 according to a location of the edge in the display screen.

Figure 6:
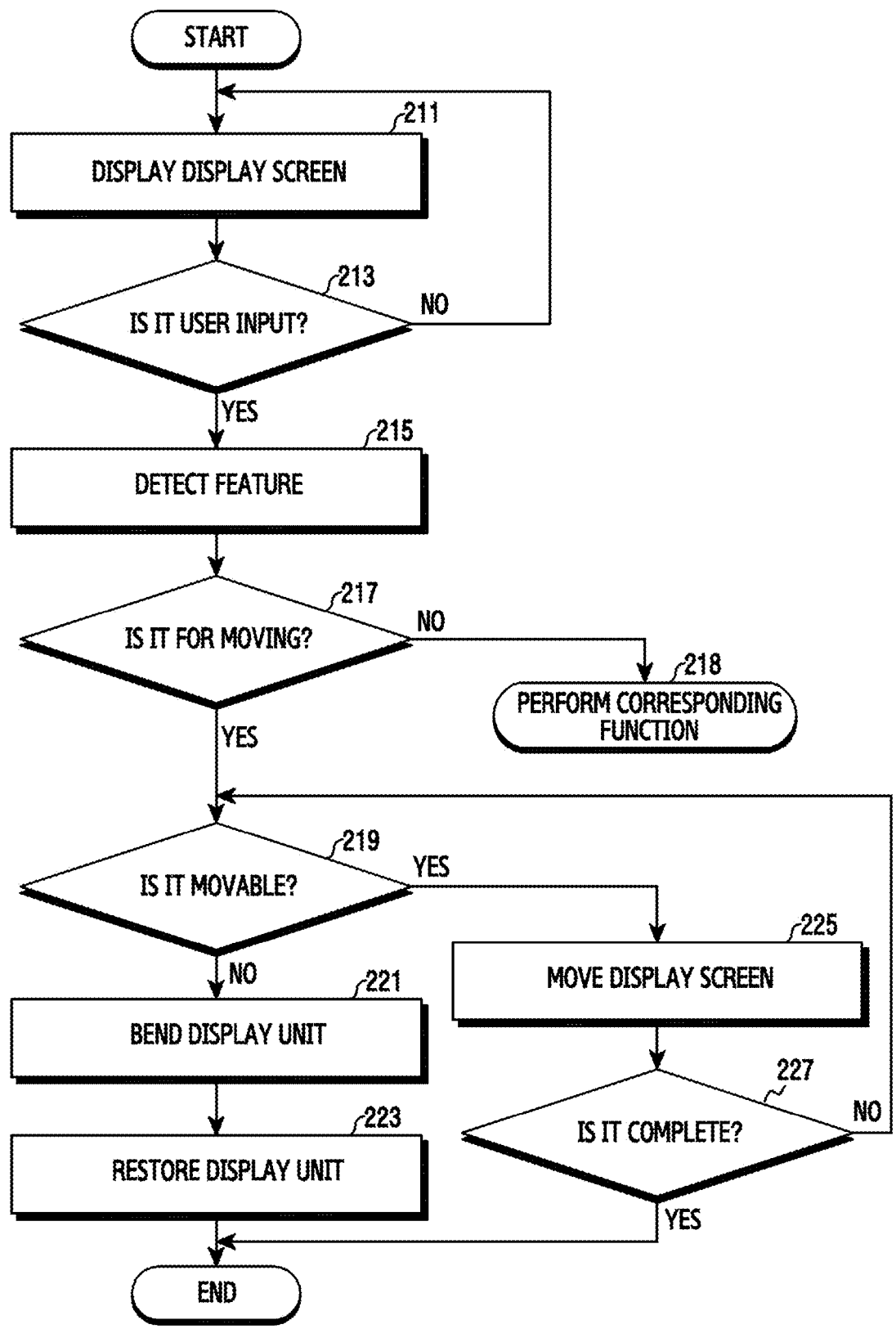
FIG. 6 is a flowchart illustrating a procedure of performing a screen display method according to an embodiment of the present disclosure.

FIG. 6 is a flowchart illustrating a procedure of performing a screen display method according to an embodiment of the present disclosure.

FIGS. 7A-10C illustrate examples of explaining a screen display method according to various embodiments of the present disclosure. In this case, FIGS. 7A, 8A, 9A, and 10A are plan views of the display unit 150, and FIGS. 7B, 8B, 9B, and 10B are lateral views of the display unit 150.

Referring to FIG. 6, the controller 170 displays a display screen 300 in operation 211. That is, the controller 170 displays the display screen through the display unit 150. In this case, the display unit 150 may display the display screen 300 as shown in FIGS. 7A and 7B. Herein, the controller 170 may display at least a part of the display screen 300. In addition, the controller 170 may display edges 310, 320, 330, and 340 of the display screen 300. More specifically, the controller 170 may display at least any one of the upper edge 310, lower edge 320, left edge 330, and right edge 340 of the display screen 300. In addition, the display screen 300 may include at least any one of an image and a text. For example, the display screen 300 may include a list formed of a plurality of user items.

Next, if a user input is generated while the display screen 300 is displayed in operation 211, the controller 170 detects this in operation 213. In this case, the user input may be generated through the input unit 120. In addition, the controller 170 detects a feature of the user input in operation 215. In this case, the feature of the user input may include at least any one of a location, a strength, and a speed of the user input. Thereafter, in operation 217, the controller 170 determines whether the user input is for moving the display screen 300. For this, the controller 170 analyzes the feature of the user input. Herein, the controller 170 may determine whether there is a locational change in the user input. In addition, if there is no locational change in the user input, the controller 170 may determine that the user input is not for moving the display screen 300. Otherwise, if there is the locational change in the user input, the controller 170 may determine that the user input is for moving the display screen 300. Moreover, if there is the locational change in the user input, the controller 170 may detect a movement distance and a movement direction in association with the locational change in the user input.

If it is determined in operation 217 that the user input is not for moving the display screen 300, the controller 170 performs a corresponding function in association with the user input in operation 218. In this case, the controller 170 may perform a mobile communication function, a data communication function, a data output function, a data storing function, an image capturing function, a voice recording function, or the like. Herein, if the display screen 300 includes a plurality of user items, the controller 170 may select any one of the user items.

If it is determined in operation 217 that the user input is not for moving the display screen 300, the controller 170 determines whether the display screen 300 is movable in operation 219. For example, the controller 170 determines whether the user input is a request for moving the edges 310, 320, 330, and 340 of the display screen 300. For this, the controller 170 may determine whether the edges 310, 320, 330, and 340 of the display screen 300 are being displayed. Herein, the controller 170 may determine whether the edges 310, 320, 330, and 340 of the display screen 330 are being displayed, in association with the movement direction of the user input.

For example, if the user input is a request for moving the display screen 300 to a lower portion, the controller 170 may determine whether the upper edge 310 of the display screen 300 is being displayed. In addition, if the upper edge 310 of the display screen 300 is being displayed, the controller 170 may determine that the display screen 300 is not movable. Alternatively, if the upper edge 310 of the display screen 300 is not being displayed, the controller 170 may determine that the display screen 300 is movable.

If the user input is a request for moving the display screen 300 to an upper portion, the controller 170 may determine whether the lower edge 320 of the display screen 300 is being displayed. In addition, if the lower edge 320 of the display screen 300 is being displayed, the controller 170 may determine that the display screen 300 is not movable. Alternatively, if the lower edge 320 of the display screen 300 is not being displayed, the controller 170 may determine that the display screen 300 is movable.

If the user input is a request for moving the display screen 300 to a right portion, the controller 170 may determine whether the left edge 330 of the display screen 300 is being displayed. In addition, if the left edge 330 of the display screen 300 is being displayed, the controller 170 may determine that the display screen 300 is not movable. Alternatively, if the left edge 330 of the display screen 300 is not being displayed, the controller 170 may determine that display screen 300 is movable.

If the user input is a request for moving the display screen 300 to a left portion, the controller 170 may determine whether the right edge 340 of the display screen 300 is being displayed. In addition, if the right edge 340 of the display screen 300 is being displayed, the controller 170 may determine that the display screen 300 is not movable. Alternatively, if the right edge 340 of the display screen 300 is not being displayed, the controller 170 may determine that display screen 300 is movable.

If it is determined in operation 219 that the display screen 300 is not movable, the controller 170 bends the display unit 150 in operation 221. That is, the controller 170 activates the driving unit 160 to bend the display unit 150. Herein, the controller 170 may supply an electrical signal to the driving unit 160 to activate the driving unit 160.

In this case, the controller 170 may adjust a bending angle of the display unit 150 according to the feature of the user input. Herein, the controller 170 may adjust the bending angle of the display unit 150 according to any one of the strength and the speed of the user input. For this, the controller 170 may adjust the strength of the electrical signal to be supplied to the driving unit 160. Alternatively, if the driving unit 160 is implemented with a structure of laminating a plurality of piezoelectric elements, the controller 170 may adjust the number of piezoelectric elements for supplying the electrical signal.

In addition, the controller 170 may divide the display unit 150 into a plurality of areas and may bend the areas in different shapes. For this, the controller 170 may partially supply the electrical signal to the driving unit 160. That is, the electrical signal may be supplied to one part of the driving unit 160, and may not be supplied to the remaining parts of the driving unit 160.

Figure 8B:
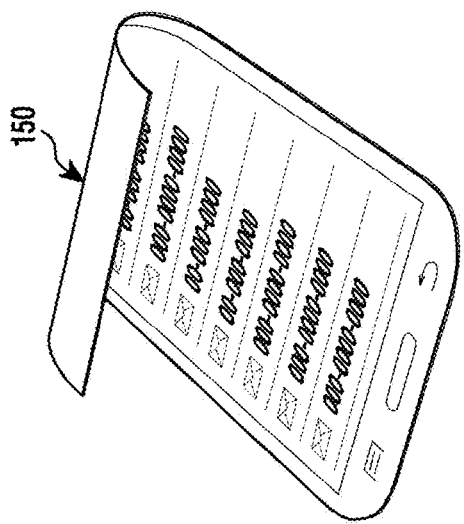
Figure 8C:
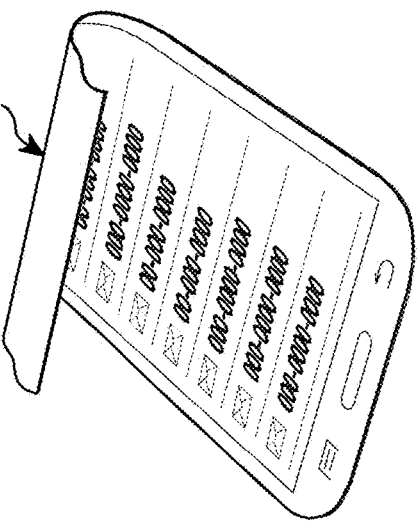
Figure 8A:
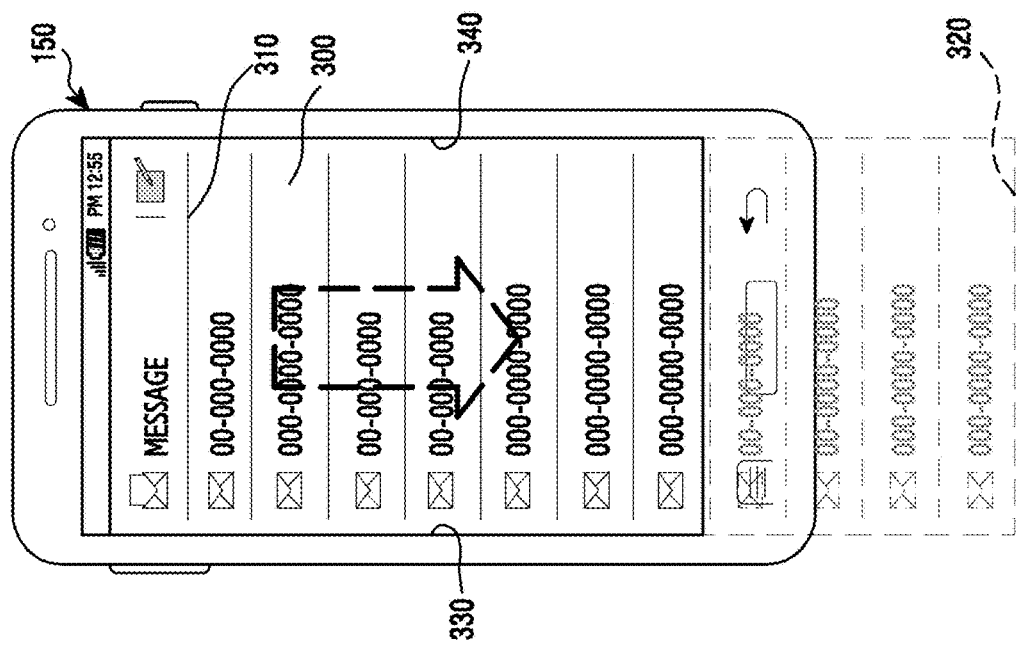

For example, if the user input is a request for moving the upper edge 310 of the display screen 300 to the lower portion, the controller 170 may bend the upper portion among the edges of the display unit 150 as shown in FIGS. 8A to 8C. Alternatively, if the user input is a request for moving the lower edge 320 of the display screen 300 to the upper portion, the controller 170 may bend the lower portion among the edges of the display unit 150 as shown in FIGS. 9A to 9C. Alternatively, the controller 170 may bend the upper portion and the lower portion together among the edges of the display unit 150 as shown in FIGS. 10A to 10C. Herein, the controller 170 may curve at least any one of the upper portion and lower portion of the display unit 150 one time as shown in FIGS. 8B, 9B, and 10B. Alternatively, the controller 170 may curve at least any one of the upper portion and lower portion of the display unit 150 several times as shown in FIGS. 8C, 9C, and 10C.

The controller 170 restores the display unit 150 in operation 223. In this case, the controller 170 may deactivate the driving unit 160 to restore the display unit 150. Herein, the controller 170 may supply the electrical signal to the driving unit 160 to activate the driving unit 160. That is, when a pre-set time elapses from a time at which the driving unit 160 is activated, the controller 170 may supply the electrical signal to the driving unit 160. Alternatively, the driving unit 160 may be autonomously deactivated to restore the display unit 150. Herein, it may be naturally deactivated at the expiry of the pre-set time from the time at which the driving unit 160 is activated. Accordingly, the screen display method according to an embodiment of the present disclosure ends.

If it is determined in operation 219 that the display screen 300 is movable, the controller 170 moves the display screen 300 in operation 225. In this case, the controller 170 may move the display screen 300 according to the feature of the user input. Herein, the controller 170 may move the display screen 300 in association with a movement direction of the user input. In addition, the controller 170 may move the display screen 400 according to at least any one of the strength and the speed of the user input.

The controller 170 determines whether the movement of the display screen 300 is complete in operation 227. In this case, the controller 170 may determine whether the display screen 300 moves by a movement distance of the user input. Thereafter, if the display screen 300 moves by the movement distance of the user input, the controller 170 stops the movement of the display screen 300. Meanwhile, if the display screen 300 does not move by the movement distance of the user input, the controller 170 returns to operation 219. In addition, the controller 170 may repetitively perform at least one of operations 219 to 227. Therefore, the screen display method according to an embodiment of the present disclosure ends.

According to an embodiment of the present disclosure, the controller 170 may control the driving unit 160 to bend the display unit 150. As a result, the controller 170 may provide an interaction for the user input by using a flexibility of the display unit 150. Therefore, various interactions can be provided through the display unit 150 of the electronic device 100. Accordingly, a usage efficiency of the display unit 150 can be improved in the electronic device 100.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying a screen, the method comprising:
   displaying at least a portion of a content on a flexible display unit;
   detecting a user input for displaying another portion of the content;
   determining whether an edge portion of the content is displayed in response to the detecting of the user input; and
   bending the flexible display unit by activating a driving unit coupled to the flexible display unit in response to displaying the edge portion of the content.

2. The method of claim 1, wherein the determining of whether the edge portion of the content is displayed in response to the detecting of the user input comprises controlling display of the content in response to the detecting of the user input.

3. The method of claim 2, wherein the bending comprises:
   identifying at least a part of the flexible display unit corresponding to the user input; and
   bending the identified at least part of the flexible display unit.

4. The method of claim 1,
   wherein the bending comprises bending the flexible display unit differently depending on a feature of the user input, and
   wherein the feature comprises at least one of a location, a strength, or a speed of the user input.

5. The method of claim 2, further comprising deactivating the driving unit to restore a shape of the flexible display unit.

6. The method of claim 2, wherein the content comprises a list formed of a plurality of user items.

7. The method of claim 6, wherein the user input comprises a request for moving an upper edge portion of the list to a lower portion while displaying the upper edge portion of the list and a request for moving a lower edge portion of the list to an upper portion while displaying the lower edge portion of the list.

8. An apparatus for displaying a screen, the apparatus comprising:
   a flexible display unit;
   a driving unit coupled to the flexible display unit and configured to bend the flexible display unit; and
   a controller configured to:
      display at least a portion of a content on the flexible display unit,
      detect a user input for displaying another portion of the content,
      determine whether an edge portion of the content is displayed in response to the detecting of the user input, and
      bend the flexible display unit by activating the driving unit in response to the displaying of the edge portion of the content.

9. The apparatus of claim 8, wherein the controller is further configured to control display of the content in response to detecting the user input.

10. The apparatus of claim 9, wherein the controller is further configured to:
    identify at least a part of the flexible display unit corresponding to the user input, and
    bend the identified at least part of the flexible display unit.

11. The apparatus of claim 8,
    wherein the controller is further configured to bend the flexible display unit differently depending on a feature of the user input, and
    wherein the feature comprises at least one of a location, a strength, or a speed of the user input.

12. The apparatus of claim 9, wherein the driving unit comprises a piezoelectric element.

13. The apparatus of claim 12, wherein the controller is further configured to activate or deactivate the driving unit by supplying an electrical signal to the driving unit.

14. The apparatus of claim 12,
    wherein the controller is further configured to activate the driving unit by supplying an electrical signal to the driving unit, and
    wherein the driving unit is deactivated when a pre-set time elapses from an activated time.

15. The apparatus of claim 12, wherein the flexible display unit is laminated on the driving unit.

16. The apparatus of claim 12, wherein the driving unit is disposed at an edge of the flexible display unit.

17. The apparatus of claim 9, wherein the controller is further configured to:
- determine whether the user input is detected in a state where the edge portion of the content is displayed on the flexible display unit, and
- maintain the state in which the edge portion of the content is displayed on the flexible display unit if the user input is detected in the state where the edge portion of the content is displayed on the flexible display unit.

18. The apparatus of claim 8, wherein a size of the content is larger than or equal to a display area of the flexible display unit.

19. The method of claim 2, wherein the controlling of the display of the content comprises:
- determining whether the user input is detected in a state where the edge portion of the content is displayed on the flexible display unit; and
- maintaining the state in which the edge portion of the content is displayed on the flexible display unit if the user input is detected in the state where the edge portion of the content is displayed on the flexible display unit.

20. The method of claim 1, wherein a size of the content is larger than or equal to a display area of the flexible display unit.

* * * * *